US007165055B2

(12) United States Patent
Maxwell, III

(10) Patent No.: US 7,165,055 B2
(45) Date of Patent: Jan. 16, 2007

(54) SYSTEMS AND METHODS FOR SOLVING NOGOOD DATABASES

(75) Inventor: John Turner Maxwell, III, Cupertino, CA (US)

(73) Assignee: Xerox Corporation, Stamford, CT (US)

( * ) Notice: Subject to any disclaimer, the term of this patent is extended or adjusted under 35 U.S.C. 154(b) by 859 days.

(21) Appl. No.: 10/073,934

(22) Filed: Feb. 14, 2002

(65) Prior Publication Data

US 2003/0154209 A1 Aug. 14, 2003

(51) Int. Cl.
*G06F 17/00* (2006.01)
*G06N 5/02* (2006.01)

(52) U.S. Cl. .............................. 706/46; 706/53; 706/12

(58) Field of Classification Search .................. 706/46, 706/53, 12; 707/3; 704/1
See application file for complete search history.

(56) References Cited

U.S. PATENT DOCUMENTS

| | | | | |
|---|---|---|---|---|
| 5,228,115 | A | * | 7/1993 | Natarajan ..................... 706/46 |
| 5,438,511 | A | * | 8/1995 | Maxwell et al. ............... 704/1 |
| 5,727,222 | A | | 3/1998 | Maxwell, III |
| 5,819,210 | A | | 10/1998 | Maxwell, III et al. |
| 5,903,860 | A | | 5/1999 | Maxwell, III et al. |
| 6,064,953 | A | | 5/2000 | Maxwell, III et al. |
| 6,085,186 | A | * | 7/2000 | Christianson et al. .......... 707/3 |
| 6,102,969 | A | * | 8/2000 | Christianson et al. ....... 717/146 |

OTHER PUBLICATIONS

Gregory M. Provan et al, Model-Based Object Recognition: A Truth Maintenance Approach, Mar. 1988, IEEE, ch2552-8/88/0000/0230, 230-235.*
Eugene C. Freuder, "A Sufficient Condition for Backtrack-Bounded Search," Journal of the Association of Computing Machinery, vol. 32, No. 4, pp. 755-761, Oct. 1985.
Rina Dechter et al., "Network-Based Heuristics for Constraint-Satisfaction Problems," Artificial Intelligence 34, pp. 1-38, 1988.
Johan de Kleer, "An Assumption-based TMS," Artificial Intelligence 28, pp. 127-162, 1986.
Johan de Kleer, "Extending the ATMS," Artificial Intelligence 28, pp. 163-196, 1986.
Jeffrey Mark Siskind, "The Culprit Pointer Method for Selective Backtracking," Department of Electrical Engineering and Computer Science, Massachusetts Institute of Technology, Jan. 1989.

* cited by examiner

*Primary Examiner*—Joseph P Hirl
(74) *Attorney, Agent, or Firm*—Oliff & Berridge, PLC

(57) ABSTRACT

Systems and methods for solving nogood databases involve generating a representation comprising a plurality of contexted disjunctions, conjoining all of the contented disjunctions to form a conjunction of contexted disjunctions, and storing the representation as the conjunction of contexted disjunctions. Nogoods are eliminated by refining the representation until a result of the conjunction of contexted disjunctions is backtrack-free or the result of the conjunction of contexted disjunctions reduces to false. In various embodiments, the refining is carried out without reordering the disjunctions and/or without merging the disjunctions. In various embodiments, the systems and methods are used for various constraint satisfaction problems, such as syntactic processing of natural language sentences, map coloring, understanding line drawings, electronic circuit analysis, and truth maintenance systems.

17 Claims, 2 Drawing Sheets

SYSTEMS AND METHODS FOR SOLVING NOGOOD DATABASES

BACKGROUND OF THE INVENTION

1. Field of Invention

This invention relates to systems and methods for solving nogood databases associated with a Boolean system of prepositional variables.

2. Description of Related Art

Constraint satisfaction problems involve the assignment of values to variables subject to a set of constraints. The set of constraints are an expression of knowledge about the variables and their relationships. Solving a constraint satisfaction problem involves finding a set of values for the variables that simultaneously satisfy the set of constraints. Constraint satisfaction problems include, for example, map coloring, understanding line drawings, electronic circuit analysis, and truth maintenance systems.

Many different approaches for solving constraint problems are known. For example, Freuder, "A Sufficient Condition for Backtrack-Bounded Search", Journal of the Association for Computing Machinery, Vol. 32, No. 4, pp. 755–761, Oct. 1985, incorporated herein by reference in its entirety, discusses an approach to bounding the backtracking of a backtrack search. Dechter et al., "Network-based Heuristics for Constraint-Satisfaction Problems", Artificial Intelligence, 34, pp. 1–38, 1988, also incorporated herein by reference in its entirety, discusses a method of generating heuristic advise to guide the order of value assignments in solving constraint satisfaction problems. See also U.S. Pat. Nos. 5,438,511, 5,727,222, 5,819,210, 5,903,860 and 6,064,953, each of which is incorporated herein by reference in its entirety.

SUMMARY OF THE INVENTION

A nogood database as used throughout the description of this invention is a database or a collection of data arranged for ease of retrieval, wherein the data comprises one or more nogoods. In the context of this invention, a nogood is a propositional variable or a conjunction of propositional variables whose associated constraints are unsatisfiable in the context of the current problem. If there is no valid solution that contains the constraints associated with a propositional variable, the propositional variable is nogood. If there is no valid solution that contains all of the constraints associated with the propositional variables, the conjunction of propositional variables is nogood. A nogood database may comprise, for example, a collection of nogoods that are indexed according to the terms or variables that occur in the nogoods. In particular, a nogood database may comprise a representation of a constraint satisfaction problem.

This invention provides systems and methods that have improved efficiency for solving nogood databases.

This invention separately provides systems and methods for reducing the of nogoods from a list of contexted disjuctions.

This invention separately provides systems and methods for generating a nogood-free or backtrack-free list of contexted disjuctions.

This invention separately provides systems and methods that create a packed or efficient representation of all combinations of a set of variables subject to a set of constraints.

This invention separately provides systems and methods that can preserve independence of independent disjunctions.

In various exemplary embodiments of the systems and methods according to this invention, nogood databases are solved by generating a representation comprising a plurality of contexted disjunctions, conjoining all of the contexted disjunctions to form a conjunction of contexted disjunctions, and storing the representation as the conjunction of contexted disjunctions. In various embodiments, nogoods are reduced, and ideally eliminated, by refining the representation until a result of the conjunction of contexted disjunctions is more or less, or ideally completely, backtrack-free or the result of the conjunction of contexted disjunctions reduces to false. In various exemplary embodiments, refining the representation is carried out without reordering the disjunctions and/or without merging the disjunctions.

In other various exemplary embodiments of the systems and methods according to this invention, the representation is transformed so that the conjunction of contexted disjunctions is more or less, or ideally completely, backtrack-free. In various exemplary embodiments, transforming the representation is carried out without reordering the disjunctions and/or without merging the disjunctions.

In other various exemplary embodiments of the systems and methods according to this invention, the representation is transformed so that choosing any disjunct from each of the disjunctions results in a valid solution. In various exemplary embodiments, transforming the representation is carried out without reordering the disjunctions and/or without merging the disjunctions.

In various exemplary embodiments of the systems according to this invention, a storage device stores a representation comprising a plurality of contexted disjunctions. A processor conjoins all of the contexted disjunctions to form a conjunction of contexted disjunctions and replaces the representation with the conjunction of contexted disjunctions. In various exemplary embodiments, the processor, or possibly another processor, reduces or ideally eliminates, nogoods by refining the representation until a result of the conjunction of contexted disjunctions is more or less, or ideally completely, backtrack-free or the result of the conjunction of contexted disjunctions reduces to false. In various other exemplary embodiments, the processor, or possibly another processor, transforms the representation so that the conjunction of contexted disjunctions is more or less, or ideally completely, backtrack-free. In still other various exemplary embodiments, the processor, or possibly another processor, transforms the representation so that choosing any disjunct from each of the disjunctions results in a valid solution.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which.

DETAILED DESCRIPTION OF EXEMPLARY EMBODIMENTS

Figure 1:
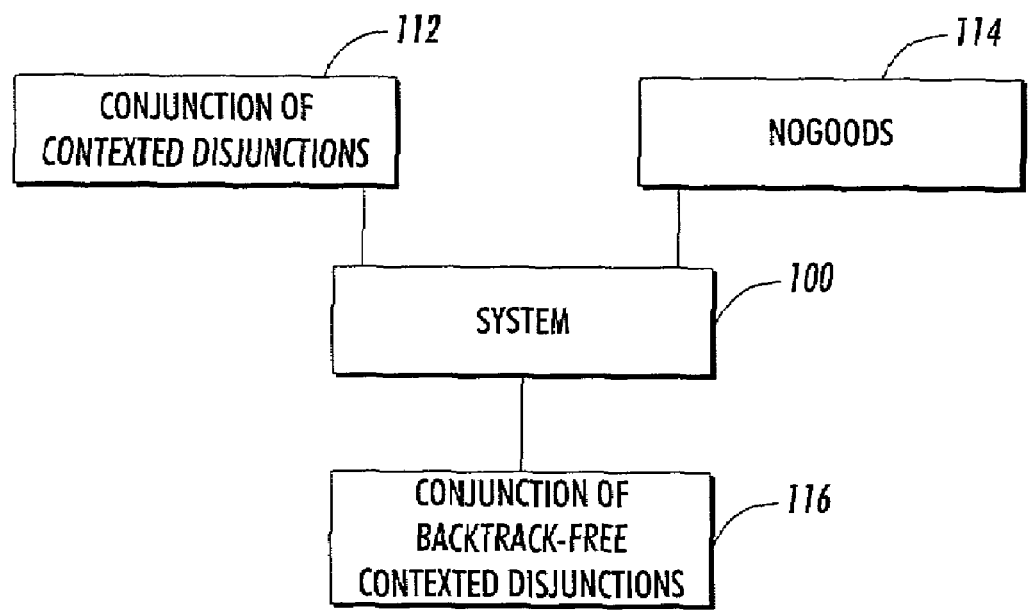
FIG. 1 is a schematic representation of one exemplary embodiment of a system according to this invention.

This invention provides a new technique for solving nogood databases associated with a Boolean system of propositional variables. According to this invention, the Boolean system of propositional variables is represented as a conjunction of contexted disjunctions. This differs from representing the Boolean system of propositional variables as a disjunction of conjunctions, such as, for example, the disjunctive normal form (DNF), as is done conventionally.

According to this invention, the general form of the solution will be:

$$(A \vee B \vee \ldots) \wedge$$

$$(P \rightarrow (E \vee F \vee \ldots)) \wedge$$

$$(Q \rightarrow (I \vee K \vee \ldots)) \wedge$$

$$\ldots$$

where A, B, etc. are propositional variables and $X \rightarrow (Y \vee Z)$ represents a contexted disjunction where X is an arbitrary Boolean expression of propositional variables. A contexted disjunction is a disjunction that holds only in the given context (if X is true, then Y or Z is true). The choices in parentheses, such as $(E \vee F \vee \ldots)$, are mutually exclusive and do no occur in any of the disjuncts of the other disjunctions. The expression $(A \vee B \vee \ldots)$ is shorthand for $TRUE \rightarrow (A \vee B \vee \ldots)$.

According to this invention, the arbitrary Boolean expressions of propositional variables that appear as the contexts of disjunctions, such as X, are required to refer only to variables that appear before them, that is, in a higher-level conjunction. This allows solutions to be enumerated by: (1) making the first disjunction the current disjunction; (2) evaluating the context of the current disjunction; (3) if the context evaluates as TRUE, non-deterministically choosing a disjunct of the disjunction and setting the propositional variable of the chosen disjunct to TRUE; (4) making the next disjunct the current disjunction; and (5) repeating steps (2)–(4) until all disjunctions of the representation have been made the current disjunction.

The resulting enumeration is backtrack-free if there are no nogoods. In other words, if there are no nogoods, then every choice that can be made will lead to a valid solution.

Conventional techniques for solving nogood databases involve representing the Boolean system of propositional variables in disjunctive normal form (DNF), pruning simpler choices during the enumeration and filtering the result by more complex nogoods when the enumeration is complete. When many independent disjunctions exist, the resulting number of solutions may be exponential in the number of disjunctions. For example, if there are 30 disjunctions, there may be up to $2^{30}$ solutions.

According to this invention, all of the contexted disjunctions are conjoined together. Then, the result is "freed" relative to the nogoods. For example, in the following conjunction:

$$(P \rightarrow (P1 \vee P2)) \wedge$$

$$(P1 \rightarrow (Q1 \vee Q2)) \wedge$$

$$(Q2 \rightarrow (R1 \vee R2))$$

$(P1 \wedge R1)$ is a no good.

The representation isn't "free" because disjuncts cannot be chosen freely from the alternatives while simultaneously guaranteeing a valid solution. For example, if P1, Q2 and R1 are chosen, then a nogood result is obtained. According to the invention, the representation is "freed" by refining or transforming the representation so that the disjuncts can be chosen freely from the alternatives while simultaneously guaranteeing a valid solution.

The disjunctions cannot be reordered or merged because doing so would violate the requirement that the variables in the context of a disjunction must be set by prior disjunctions, as noted above.

One way to "free" the representation is to refine or transform the representation to the following:

$$(P \rightarrow (P1 \vee P2)) \wedge$$

$$(P1 \rightarrow (Q1 \vee Q2)) \wedge$$

$$(Q2 \wedge P1 \rightarrow R2) \wedge$$

$$(Q2 \wedge \neg P1 \rightarrow (R1 \vee R2))$$

by splitting $Q2 \rightarrow (R1 \vee R2)$ into $Q2 \wedge P1 \rightarrow R2$ and $Q2 \wedge \neg P1 \rightarrow (R1 \vee R2)$ to isolate the situation where both P1 and R1 are true at the same time and pruning R1 where it occurs in the context of P1, since $P1 \wedge R1$ is a nogood. If pruning R1 were to eliminate the last disjunct in the disjunction, then the context would become nogood and would be added to the nogood database to be processed.

The resulting representation is a conjunction of contexted disjunctions that is backtrack-free. If $P1 \wedge Q$ and $Q2 \wedge R$ are picked, then R1 cannot be picked because the only disjunction whose context is true is $R \wedge P1 \rightarrow R2$.

In general, the contexted disjunctions are "freed" one nogood at a time. For each nogood, a list of each disjunction is made such that (1) the disjunction mentions one of the nogood's propositional variables in its disjunctions, and (2) all of the other nogood variables occur in disjunctions before the current disjunction. There may be more than one such disjunction because of splits caused by previous nogoods.

Each disjunction is then split into two mutually exclusive disjunctions based on the nogood. This is done by eliminating the disjunction's variable from the nogood, and then conjoining the reduced nogood with the first disjunction and the negation of the reduced disjunction with the second disjunction. The nogood's variable is then pruned from the first disjunction's list of disjuncts. If the first disjunction becomes empty, then the context of the disjunction is made nogood, adding it to the nogood database in such a way that it will be processed with the rest of the nogoods.

The above approach assumes that nogoods are represented as simple conjunctions of propositional variables. If the nogoods are not in this form, but also include disjunctions and negations, then the nogoods can be converted to this form by using standard techniques involving disjunctive normal form (DNF) and DeMorgan's Law. Alternatively, one may create a truth table of the variables involved in the nogood and use the lines in the truth table that are true as input to the above approach.

The above approach may also be improved by processing the nogoods in the nogood database more intelligently. For example, one may simplify the nogoods and process the simplest nogoods first, or eliminate redundant nogoods.

Because of the approach provided by this invention, if the contexted disjunctions are mostly independent, then the number of disjunctions in the result will tend to be polynomial in the number of disjunctions in the input. This means that the output can be exponentially smaller than other techniques in some circumstances. It also means that the above approach can produce the output in exponentially less time than other techniques in some circumstances.

FIG. 1 is a schematic representation of an exemplary embodiment of a system 100 for solving nogood databases according to this invention. According to this representation, a conjunction of contexted conjunctions 112 and associated nogoods 114 are processed to obtain a conjunction of backtrack-free contexted disjunctions 116.

Figure 2:
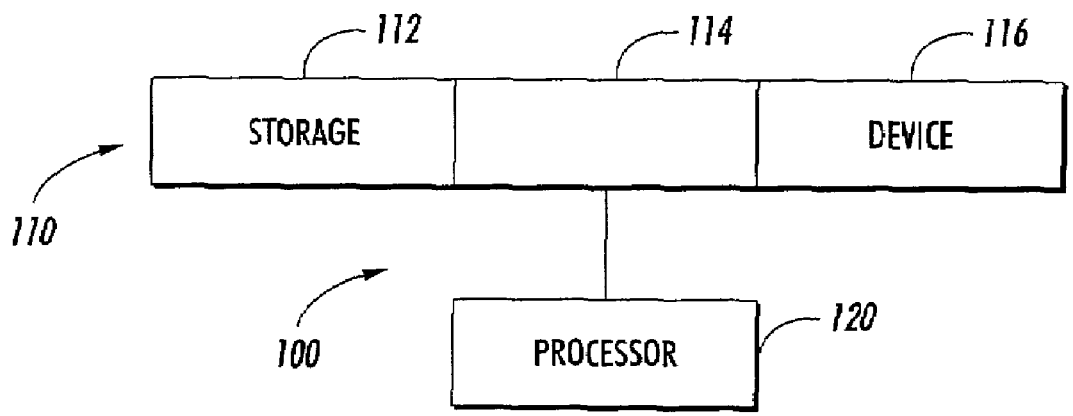
FIG. 2 is an exemplary block diagram of the embodiment of FIG. 1.

FIG. 2 is an exemplary block diagram for one exemplary embodiment of the system shown in FIG. 1. As shown, the system 100 comprises a storage device 110 and a processor 120. The storage device 110 is used to store a representation comprising a plurality of contexted disjunctions, for example, the conjunction of contexted conjunctions 112. The storage device 110 is also used to store the associated nogoods 114. The processor 120 may be used to generate the conjunction of contexted conjunctions 112 and/or to identify the associated nogoods 114.

In various embodiments, the processor 120 processes the conjunction of contexted disjunctions 112 and refines the representation until a result of the conjunction of contexted disjunctions 112 is backtrack-free or the result of the conjunction of contexted disjunctions 112 reduces to false. In this manner, nogoods are removed from the conjunction of contexted disjunctions 112 to obtain the conjunction of backtrack-free contexted disjunctions 116. The processor 120 may refine the representation without reordering the disjunctions and/or without merging the disjunctions.

In other various embodiments, the processor 120 processes the conjunction of contexted disjunctions 112 and transforms the representation so that the conjunction of contexted disjunctions 112 is backtrack-free or so that choosing any disjunct from each of the disjunctions results in a valid solution. The conjunction of backtrack-free contexted disjunctions 116 is thus obtained. The processor 120 may transform the representation without reordering the disjunctions and/or without merging the disjunctions.

Figure 3:
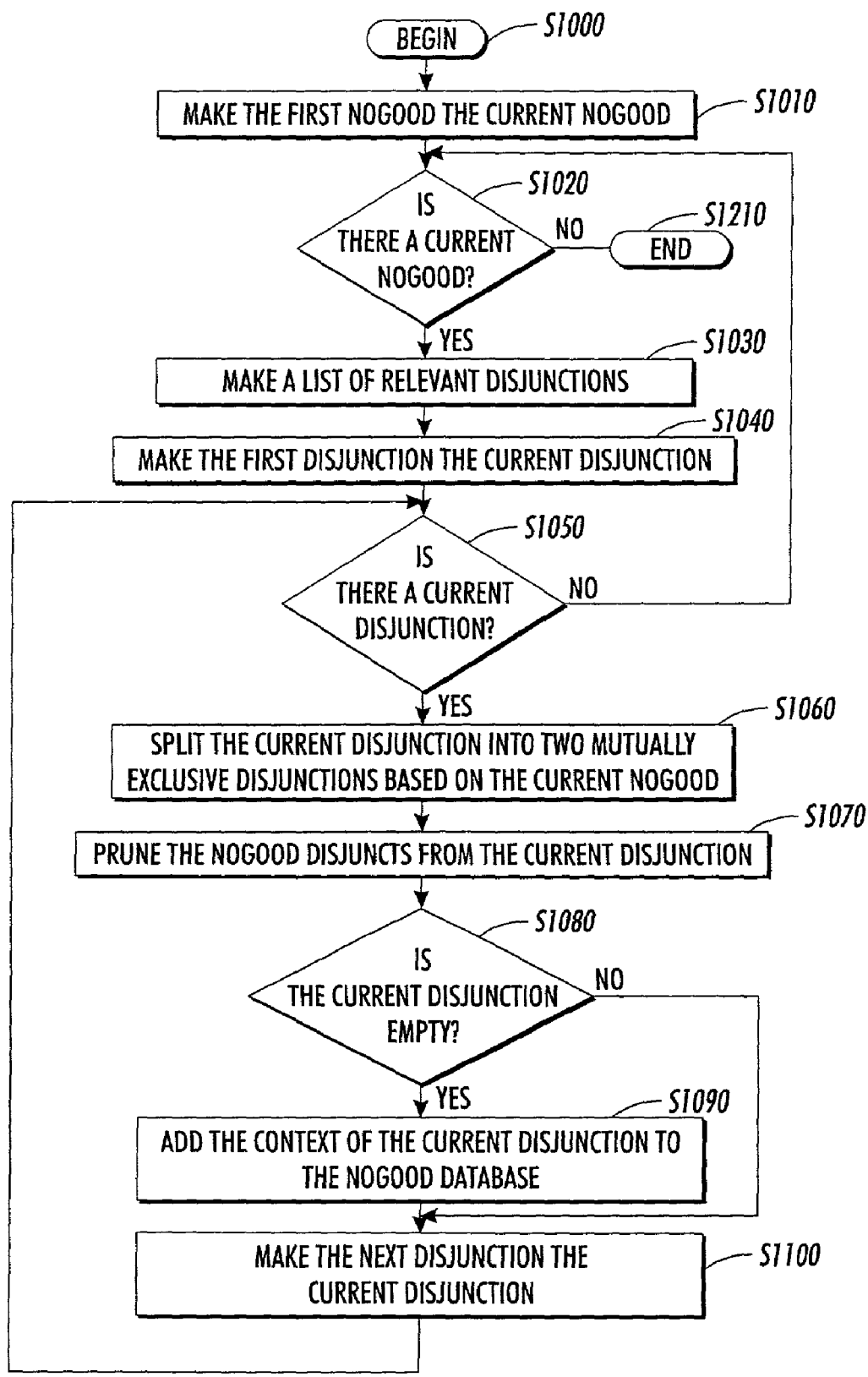
FIG. 3 is a flowchart illustrating one exemplary embodiment of a method for solving nogood databases according to this invention.

FIG. 3 is a flowchart illustrating one exemplary embodiment of a method for solving nogood databases according to this invention. Beginning in step S1000, operation continues to step S1010, where the first nogood is made the current nogood. Then, in step S1020, a determination is made whether a current nogood exists. If not, operation jumps to S1210, where the process ends. Otherwise, operation continues to step S1030.

If a current nogood exists in step S 1020, in step S1030, a list of relevant disjunctions is made. A disjunction is relevant if: (1) one of the nogood's variable is mentioned in the disjuncts; and (2) all of the other variables of the nogood occur in disjunctions before this disjunction. Next, in step S1040, the first disjunction is made the current disjunction. Then, in step S1050, a determination is made whether a current disjunction exists. If a current disjunction exists, operation continues to step S1060. Otherwise, operation returns to step S1020.

In step S1060, the current disjunction is split into mutually exclusive disjunctions based on the nogood. Then, in step S1070, nogood disjuncts are pruned from the current disjunction. Next, in step S1080, a determination is made whether the current disjunction is empty. If so, operation proceeds to step S1090. Otherwise, operation jumps directly to step S1100.

In step S1090, the context of the first disjunction is added to the nogood database, and continues to step S1100. Then, in step S1100, the next disjunction is made the current disjunction. Operation then returns to step S1050.

If a current disjunction does not exist, control jumps from step S1050 to step S1200, where the next nogood is made the current nogood, and returns to step S1020. If a current nogood does not exist, control jumps from step S1020 to step S1210, where the process ends.

The systems and methods for solving nogood databases according to this invention may be implemented on a programmed general purpose computer. However, the systems and methods for solving nogood databases according to this invention can also be implemented on a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 3 can be used to implement the systems and methods according to this invention.

The various blocks shown in FIG. 2 can be implemented as portions of a suitably programmed general-purpose computer. Alternatively, the various blocks shown in FIG. 2 can be implemented as physically distinct hardware circuits within an ASIC, or using a FPGA, a PDL, a PLA or a PAL, or using discrete logic elements or discrete circuit elements. The particular form each of the blocks shown in FIG. 2 will take is a design choice and will be obvious and predicable to those skilled in the art based on the above description.

In particular, the processor 120 shown in the exemplary embodiment may comprise any known or hereafter developed device and/or software that is capable of carrying out the various steps of generating a representation, conjoining contexted disjunctions, and refining and/or transforming a representation as described above. Similarly, the storage device 110 shown in the exemplary embodiment may comprise any known or hereafter developed device that allows storage and retrieval of information that constitutes a representation comprising a plurality of contexted disjunctions.

While this invention has been described in conjunction with various exemplary embodiments, it is to be understood that many alternatives, modifications and variations would be apparent to those skilled in the art. Accordingly, Applicant intends to embrace all such alternatives, modifications and variations that follow in the spirit and scope of this invention.

For example, it should be understood that the design and configuration of the system are illustrative and not limiting. The systems and methods of this invention may be used for various applications, either known or hereafter developed, that utilize the solution of constraint satisfaction problems. The particular design and configuration of the system may vary with the particular application.

What is claimed is:

1. A method for solving nogood databases within a natural language constraint satisfaction problem, comprising:

generating a representation of possible solutions to the problem comprising a plurality of contexted disjunctions;

conjoining all of the contexted disjunctions by anding the contexted disjunctions together to form a conjunction of contexted disjunctions;

storing the representation as the conjunction of contexted disjunctions; and eliminating nogoods by refining the representation until a result of the conjunction of contexted disjunctions is backtrack-free or the result of the conjunction of contexted disjunctions reduces to false, a nogood being a prepositional variable or a conjunction of prepositional variables whose constraints are unsatisfiable in the context of the problem.

2. The method of claim 1, wherein refining the representation is carried out without reordering the disjunctions.

3. The method of claim 1, wherein refining the representation is carried out without merging the disjunctions.

4. The method of claim 1, further comprising transforming the representation so that the conjunction of contexted disjunctions is backtrack-free.

5. The method of claim 4, wherein transforming the representation is carried out without reordering the disjunctions.

6. The method of claim 4, wherein transforming the representation is carried out without merging the disjunctions.

7. The method of claim 1, further comprising transforming the representation so that choosing any disjunct from each of the disjunctions results in a valid solution.

8. The method of claim 7, wherein transforming the representation is carried out without reordering the disjunctions.

9. The method of claim 7, wherein transforming the representation is carried out without merging the disjunctions.

10. The method of claim 1, further comprising:
solving a nogood database using the representations, the nogood database comprising at least one nogood.

11. The method of claim 1, wherein a nogood is a propositional variable or a conjunction of propostional variables whose associated constraints are unsatisifable.

12. The method of claim 1, the method further comprising:
outputting the result to a user, the natural language constraint satisfaction problem being a natural language parsing constraint satisfaction problem.

13. The method of claim 1, the method further comprising:
outputting the result to a user, the natural language constraint satisfaction problem being a natural language translation constraint satisfaction problem.

14. A system for solving nogood databases within a natural language constraint satisfaction problem, comprising:
a storage device that stores a representation comprising a plurality of contexted disjunctions; and
a processor that:
conjoins all of the contexted disjunctions to form a conjunction of contexted disjunctions and replaces the representation with the conjunction of contexted disjunctions; and
eliminates nogoods by refining the representation until a result of the conjunction of contexted disjunctions is backtrack-free or the result of the conjunction of contexted disjunctions reduces to false, a nogood being a prepositional variable or a conjunction of prepositional variables whose constraints are unsatisfiable in the context of the problem.

15. The system of claim 14, further comprising a processor that transforms the representation so that the conjunction of contexted disjunctions is backtrack-free.

16. The system of claim 14, further comprising a processor that transforms the representation so that choosing any disjunct from each of the disjunctions results in a valid solution.

17. A method for solving nogood databases within a natural language constraint satisfaction problem, comprising:
generating a representation comprising a plurality of contexted disjunctions;
conjoining all of the contexted disjunctions to form a conjunction of contexted disjunctions;
storing the representation as the conjunction of contexted disjunctions; and
eliminating nogoods by setting a first nogood to be a current nogood and repeating the steps of:
(a) if there is no current nogood, stopping further execution of the eliminating nogoods step,
(b) creating a list of relevant disjunctions,
(c) setting a current disjunction to a first disjunction in the list of relevant disjunctions,
(d) if there is no current disjunction, returning to step (a),
(e) splitting the current disjunction into two mutually exclusive disjunctions based on the current nogood,
(f) pruning the nogood disjuncts from the current nogood,
(g) if the current nogood is not empty, going forward to step (i),
(h) adding a context of the current nogood to the nogood database, and
(i) making the next disjunction the current disjunction and returning to step (d),
until a result of the conjunction of contexted disjunctions is backtrack-free or the result of the conjunction of contexted disjunctions reduces to false, a nogood being a prepositional variable or a conjunction of preposional variables whose constraints are unsatisfiable in the context of the problem.

* * * * *